UNITED STATES PATENT OFFICE.

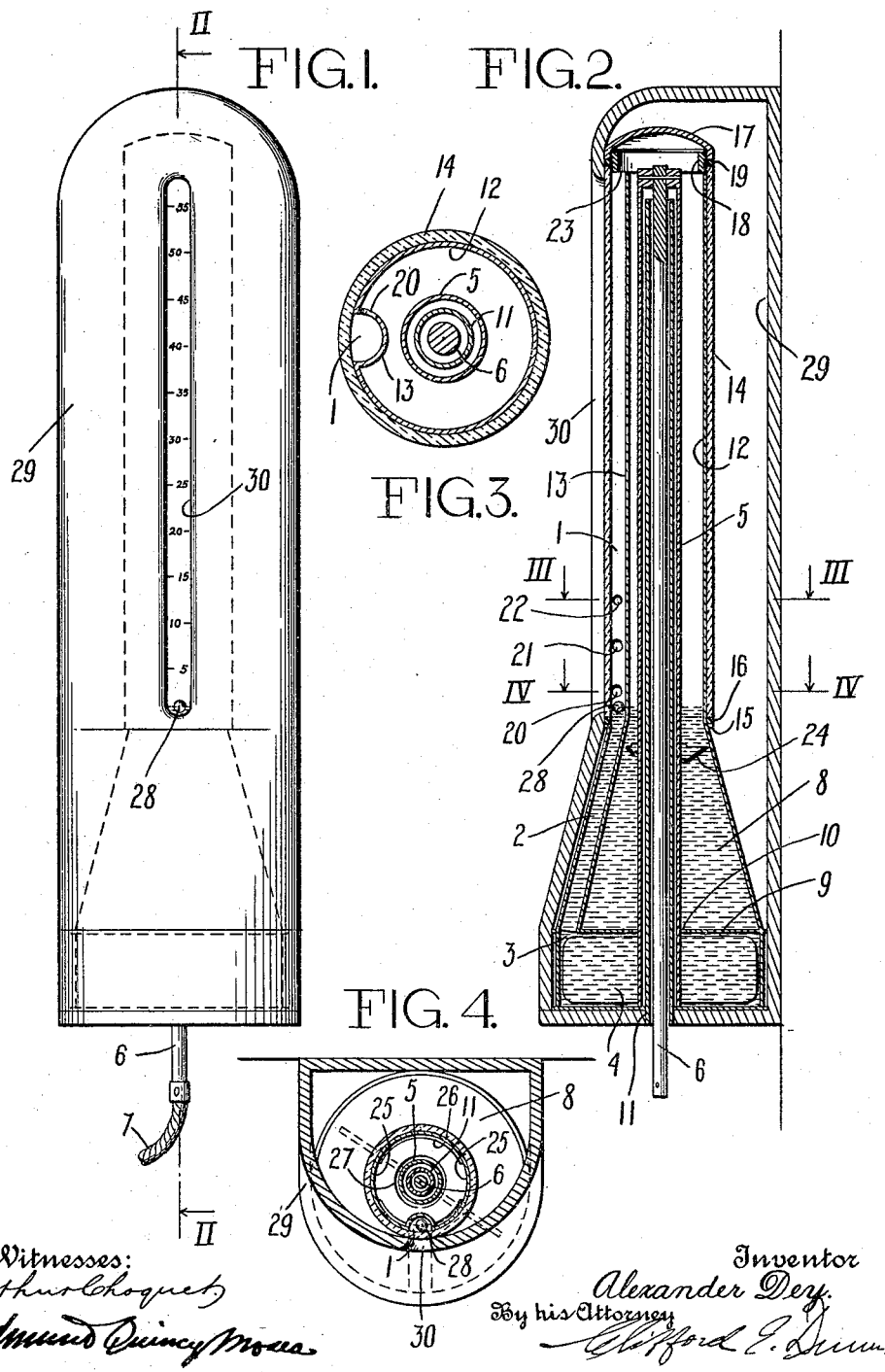

ALEXANDER DEY, OF EDINBURGH, SCOTLAND.

SPEEDOMETER.

1,277,877.

Specification of Letters Patent.   Patented Sept. 3, 1918.

Application filed December 26, 1913.   Serial No. 808,755.

*To all whom it may concern:*

Be it known that I, ALEXANDER DEY, a subject of the King of Great Britain, residing at Edinburgh, Scotland, have invented certain new and useful Improvements in Speedometers, of which the following is a specification.

This invention relates to instruments for measuring or indicating speed and is adapted to indicate the rate of rotation of a rotatable member, such as a machine element or vehicle wheel, it being particularly designed for indicating the speed of travel of a vehicle.

It has heretofore been proposed to utilize a column of liquid forced upward by centrifugal force caused by the action of a fan or otherwise, to indicate the speed of a rotatable member, but difficulty has been experienced for the reason that the rise of the column of liquid was substantially proportional to the square of the velocity of rotation and therefore was excessive for high velocities. As a result an abnormally long column of liquid was required and its rise was so rapid as to be beyond control and incapable of accurate measurement.

My present invention relates primarily to means for obviating this difficulty by providing for the control of the rise of the liquid within the desired limits. It is possible by my invention to make the rise of the liquid column directly proportionate to the changes in velocity so that a uniformly divided scale may be provided.

My invention also provides certain structural improvements in instruments of this character obviating the use of stuffing boxes, preventing evaporation of the indicating fluid, preventing the entrance of air bubbles into the liquid column and otherwise improving the construction and mode of operation of the apparatus.

In the accompanying drawing which forms a part of this specification and which illustrates one preferred embodiment of my invention, Figure 1 is a front elevation of an instrument containing my improvements.
Fig. 2 is a vertical section thereof taken on line II—II of Fig. 1.

Fig. 3 is a horizontal sectional view on an enlarged scale taken on line III—III of Fig. 2, the outer casing of the device being omitted.

Fig. 4 is a sectional view on line IV—IV of Fig. 2.

Referring to the drawings in detail, the numeral 1 designates a channel, preferably substantially vertical, in which the indicating fluid is caused to rise by any suitable means dependent upon the velocity of rotation of the part whose speed is to be measured. This channel may be of any suitable construction and the means for causing the rise of the column of fluid may be of any desired nature adapted to accomplish the intended purpose. As shown the lower end of the channel 1 is connected by means of a duct 2 to a chamber 3 in which is rotated a fan 4. The fan 4 comprises a pair of blades secured to a sleeve 5, which is attached at its upper end to a shaft 6. The shaft 6 is connected to be driven from the part whose speed of rotation is to be measured, any suitable means being provided for this purpose, for example, a flexible torsion shaft 7. A reservoir for the indicating fluid is preferably provided above the chamber 3, this reservoir in the present instance comprising a conical chamber 8 which is partly separated from the chamber 3 by a partition 9. The fluid is permitted to flow from the chamber 8 to the chamber 3 through the narrow space 10 around the sleeve 5.

It is usually most convenient to have the shaft for imparting motion to the fan enter the apparatus at the bottom and in order to prevent leakage from the chamber 3, I extend the shaft 6 up through the bottom of the apparatus to a level above that of the indicating fluid in the reservoir. A tube 11 firmly secured to the bottom of the chamber 3 extends up around the shaft 6 and inside of the sleeve 5, also to a point above the level of the fluid in the reservoir and thus a liquid seal is effected for the opening through which the shaft enters the apparatus. Leakage or evaporation of the fluid is thus prevented and the use of stuffing boxes for the shaft 6 is avoided. The tube 11 also forms a bearing for the shaft, sleeve and fan. The end of the sleeve 5 preferably bears against the bottom of the chamber 3.

As will be hereinafter explained, the channel 1 is provided with an outlet or outlets for discharging a part of the fluid of the column and means are provided for returning the overflow from said outlets to the reservoir 8. The construction of the channel and means for returning the overflow may be of any suitable nature, but I prefer to construct this part of the apparatus as follows:

A tubular casing 12 is connected to the top of the reservoir 8 and has formed in one side a substantially vertical depression or groove 13 which forms the rear wall of the channel 1. The front wall of the channel which must be transparent in order to permit the height of the column of indicating fluid to be observed is preferably formed by a portion of a glass tube 14, which is fitted over the tubular casing 12. The glass tube 14 rests upon a ledge 15 formed at the lower end of the tubular casing 12, a washer or packing 16 of rubber or other suitable material being preferably interposed at this point in order to form a tight joint. The glass tube is held in position by a cap 17 which also closes the upper end of the tubular chamber of the apparatus. The cap 17 may be secured in place in any suitable manner, as by screwing it upon a threaded extension 18 of the tubular casing 12, a washer or packing 19 being interposed between the cap and the end of the glass tube. By screwing down the cap, the glass tube is firmly held between the packing 16 and 19, and the channel and casing of the apparatus are thus effectually sealed. The glass tube 14 preferably fits the tubular casing snugly so as to prevent the escape of the liquid out of the channel 1, but this fit need not be absolutely tight, as the glass tube entirely surrounds the metal part 12 and therefore prevents evaporation even if some leakage out of the channel is possible.

The device is normally filled with liquid up to the level of the top of the conical chamber 8 and the bottom of the glass tube. Upon the rotation of the shaft 6, which revolves the sleeve 5 and fan blades 4, the fluid in the chamber 3 is thrown outwardly and the resulting pressure causes the fluid to rise in the column 1. Ordinarily the pressure in the chamber 3 will increase proportionately to the square of velocity of rotation of the fan, which would tend to cause the fluid in the column to rise proportionately to the square of the velocity. This has been found objectionable in previous speedometers of the fluid type for the reason that at the higher velocities the rise of the column is so rapid as to be beyond control and to render the device ineffectual for the purpose for which it is intended. The length of the channel required is excessive and has rendered such devices impractical.

In accordance with the present invention, means are provided for overcoming this defect and controlling the rise of the column so as to keep the same within the desired limits. This result is accomplished by providing one or more outlets at suitable points in the channel, which permit the escape of some of the fluid therefrom and so reduce the rate of rise of the column. In the particular embodiment of my invention shown, I have provided a series of holes 20, 21 and 22 through the wall of the groove or depression 13. These holes may be of such suitable number, size and position as may be found necessary to effect the desired operation. I have shown three holes arranged one above the other for this purpose, the upper hole 22 being somewhat smaller than the other two, but I do not wish to limit myself to this number of holes or to the relative proportion or spacing thereof. The upper end of the channel is preferably open, as indicated at 23, so that at excessive speeds, the liquid driven up the channel may overflow into the tubular chamber 12 and return through it to the reservoir 8. The shaft 6, tube 11, and sleeve 5 preferably project up into this chamber 12, as indicated, though it is not necessary for them to project entirely up to the top of the chamber as shown The fluid escaping through the holes 20, 21 and 22 also falls back through the chamber 12 into the reservoir 8. I have found that the fluid discharged through these holes in falling back to the reservoir, sometimes entraps air bubbles which tend to find their way back to the fan chamber and are forced from the latter up into the fluid column. The presence of the air bubbles in the fluid column interferes with the accurate reading of the device and I preferably provide means for breaking up and eliminating the same. For this purpose, it is simply necessary to provide a screen or baffle plate in the lower part of the chamber 12 or reservoir 8 which the returning fluid must pass. I have illustrated suitable means for this purpose comprising an inverted cone 24 secured to the wall of the chamber 8, throughout a part of its periphery as indicated at the points 25. Narrow spaces are left at 26 between the periphery of the cone-shaped baffle plate and the inner wall of the chamber 8 and a narrow space 27 is left around the sleeve 5. The passage of the fluid through these narrow spaces breaks up and removes the air bubbles. This process is further effected by the passage of the fluid through the narrow space 10, where the sleeve 5 passes through the partition 9.

In order that the position of the top of the fluid column may be readily observed, a float 28 may be carried upon the same if desired. The device is preferably inclosed in a suitable case 29, which serves to protect the apparatus and present an attractive appearance, and by which the apparatus may be fastened to any suitable support. The front of the case is provided with a slot 30 through which the liquid column may be observed and a suitable scale is preferably provided to measure the rise of the column. For indicating the speed of revolution of a piece of machinery, this scale may be divided to show revolutions per minute, or other desired unit, while for registering the speed of a vehicle, the scale is preferably divided to indicate miles per hour.

By properly proportioning the outlets in the channel, it is possible to secure a substantially uniform rise of the fluid column for uniform increments of speed and thus to use a scale divided equally throughout or substantially throughout its height. This is of decided advantage as it facilitates the accurate reading of the instrument.

The operation of the apparatus will be apparent from the foregoing description. When the fan is at rest the fluid level is at the bottom of the channel 1 and indicates zero. Upon the rotation of the fan 4, the fluid column is forced up the channel carrying the float 28 with it. As the speed increases, the column rises uniformly, any excessive rise being prevented by the overflow of a part of the fluid through one or more of the outlets in the channel. As the column rises, the outflow increases and partly compensates for the increase of pressure due to the greater velocity of the fan so that a uniform or any desired rate of rise of the column may be secured.

The fluid system of the apparatus as a whole is hermetically sealed, so that evaporation of the fluid is effectually prevented and a constant volume of fluid maintained within the device, thus securing accurate indication at all times.

While I have illustrated in the drawing and described in detail one specific embodiment of my invention, it is to be understood that I do not limit myself to the details thereof, but the principle of my invention is capable of embodiment in other forms of apparatus, and I, therefore, intend to cover my invention in its various applications broadly.

Having thus described my invention, I claim:

1. In a speedometer, the combination of a chamber, a rotatable fan therein, a liquid reservoir above said chamber, a channel above said reservoir, a duct connecting the peripheral portion of said chamber to the lower end of said channel, the wall of said channel having an overflow outlet therein, means for returning the overflow from said outlet to said reservoir, and constantly operative means for removing air bubbles from the liquid flowing back to said reservoir.

2. In a speedometer, a channel for a fluid indicating column comprising a perforated metal rear wall and a glass front wall.

3. In a speedometer, the combination of a chamber, a liquid actuating member therein and a channel for a liquid indicating column connected at its lower end with said chamber, said chamber comprising a perforated metal rear wall and a glass front wall.

4. In a speedometer, the combination of a chamber, a fluid actuating member therein, a hollow metallic casing above said chamber, a portion of the outer wall of said casing forming one wall of a channel for the indicating fluid column, a transparent member engaging said casing forming the other wall of said channel.

5. In a speedometer, the combination of a chamber, a rotatable fluid actuating member therein, a tubular casing above said chamber, said casing having a substantially vertical depression or groove in one side thereof, and a glass tube inclosing said tubular casing, the wall of said groove and a portion of said glass tube forming a channel for the fluid column.

6. In a speedometer, the combination of a chamber, a rotatable fluid actuating member therein, a tubular casing above said chamber, said casing having a substantially vertical depression or groove in one side thereof, and a glass tube inclosing said tubular casing, the wall of said groove and a portion of said glass tube forming a channel for the fluid column, the wall of said groove being perforated.

7. In a speedometer, the combination of a chamber, a rotatable fluid actuating member therein, a fluid reservoir above said chamber, a tubular casing above said reservoir, said casing having a substantially vertical depression or groove in one side thereof, and a glass tube inclosing said tubular casing, the wall of said groove and a portion of said glass tube forming a channel for the fluid column, the wall of said groove being provided with a plurality of perforations spaced one above the other.

8. In a speedometer, the combination of a chamber, having an opening in the bottom thereof, a tube secured to the bottom of said chamber around said opening and projecting up through the chamber, a shaft projecting up through said tube, a sleeve secured to the upper end of said shaft, inclosing said tube and extending down into said chamber, a fan mounted on said sleeve within the chamber, a liquid reservoir above said chamber, a tubular casing connected with the upper end of said reservoir, an annular seat around the lower end of said tubular casing, a glass tube surrounding said casing and resting on said seat, a cap closing the upper end of said tubular casing engaging the upper end of said glass tube to clamp the same upon said seat, said tubular casing having a substantially vertical groove in one side thereof forming with a portion of the wall of said glass tube a substantially vertical channel, and a duct connecting the peripheral portion of said fan chamber with the lower end of said channel.

9. In a speedometer, the combination of a channel, a liquid indicating column therein the top of which constitutes a visible index, means responding to changes in speed for varying the height of the column, and a normally open overflow outlet in said channel above the lower end thereof permitting some of the liquid to flow out of said outlet whenever the top of the liquid column reaches or passes above the level thereof.

10. In a speedometer or the like, a chamber containing a body of liquid, a channel connected therewith, means responding to variations of speed for causing the liquid to rise in said channel, said channel having a normally open outlet therein permitting a part of the liquid as it rises in the channel to escape, means for returning the liquid which escapes to the chamber, and constantly operative means for removing air bubbles from the returning liquid.

11. In a speedometer or the like, a chamber containing a body of liquid, a channel connected therewith, means responding to variations of speed for causing the liquid to rise in said channel, said channel having a normally open outlet therein permitting a part of the liquid as it rises in the channel to escape, means for returning the liquid which escapes to the chamber, and means providing narrow passage ways through which the returning liquid must pass for removing air bubbles from said liquid.

In witness whereof I have hereunto set my hand, in the presence of two subscribing witnesses, this 6th day of December, 1913.

ALEXANDER DEY.

Witnesses:
FREDERICK PIATT,
GEDDES WHITELAW.

Copies of this patent may be obtained for five cents each, by addressing the "Commissioner of Patents, Washington, D. C."